United States Patent [19]
Blumenstein et al.

[11] Patent Number: 5,283,127
[45] Date of Patent: Feb. 1, 1994

[54] SEALABLE, PEELABLE PLASTICS FILM

[75] Inventors: Uwe Blumenstein, Ludwigshafen; Dietmar Bender, Schifferstadt; Helmut Jenne, Schriesheim, all of Fed. Rep. of Germany

[73] Assignee: BASF Aktiengesellschaft, Ludwigshafen, Fed. Rep. of Germany

[21] Appl. No.: 914,126

[22] Filed: Jul. 17, 1992

[30] Foreign Application Priority Data

Jul. 17, 1991 [DE] Fed. Rep. of Germany ........ 4123672

[51] Int. Cl.$^5$ .................... B32B 27/30; B32B 27/34; B32B 27/36
[52] U.S. Cl. ................... 428/476.3; 428/475.8; 428/476.9; 428/483; 428/516; 428/517; 428/520; 428/521
[58] Field of Search .............. 428/474.4, 475.8, 476.1, 428/476.3, 476.9, 483, 516, 517, 520, 521, 523

[56] References Cited

U.S. PATENT DOCUMENTS

| | | | |
|---|---|---|---|
| 4,110,500 | 8/1978 | Evans et al. | 428/35 |
| 4,332,858 | 6/1982 | Saitoh et al. | 428/412 |
| 4,361,237 | 11/1982 | Heirmans et al. | 206/631 |
| 4,367,312 | 1/1983 | Bontinck et al. | 525/93 |
| 4,647,509 | 3/1987 | Wallace et al. | 428/474.9 |

FOREIGN PATENT DOCUMENTS

| | | |
|---|---|---|
| 1139713 | 1/1983 | Canada . |
| 0024270 | 2/1981 | European Pat. Off. . |
| 042831 | 1/1984 | European Pat. Off. . |
| 0203425 | 12/1986 | European Pat. Off. . |
| 0475887 | 3/1992 | European Pat. Off. . |
| 3921677 | 1/1991 | Fed. Rep. of Germany . |
| 53-137242 | 11/1978 | Japan . |

*Primary Examiner*—Paul J. Thibodeau
*Assistant Examiner*—D. S. Nakarani
*Attorney, Agent, or Firm*—Keil & Weinkauf

[57] ABSTRACT

Multilayer, sealable plastics films essentially consist of

A: a top layer A of a polymer which is dimensionally stable at elevated temperatures and has a melting point above 200° C., B: an adhesion promoter B of from 30 to 95% by weight of a styrene/butadiene block copolymer, up to 95% by weight of polystyrene and/or high impact polystyrene and from 5 to 70% by weight of a polymer which is incompatible with polystyrene and contains polar groups, the percentages being based on B, C: a substrate layer C of from 5 to 100% by weight of a styrene/butadiene block copolymer and up to 95% by weight of polystyrene and/or high impact polystyrene, D: if required, a barrier layer D which may correspond to the top layer A and E: a sealing layer E whose composition essentially corresponds to that of the adhesion promoter B.

5 Claims, No Drawings

SEALABLE, PEELABLE PLASTICS FILM

BACKGROUND OF THE INVENTION

Field of the Invention

The present invention relates to a multilayer, sealable plastic film.

Description of the Related Art

Japanese Patent Publication 41 892/79 describes a heat-seal film which is composed of an ethylene/acrylate copolymer and a styrene/butadiene block copolymer; Japanese Patent Publication 137 242/78 uses for this purpose a blend of styrene/butadiene block copolymer and/or high impact polystyrene and an ethylene/vinyl acetate copolymer. Similar proposals for a sealable film which permit polystyrene containers to be sealed are made in the further publications

JA-047 462/78
JA-011 761/87
JA-133 735 87
JA-147 650/89
DE-A-2 944 344.

The adhesion and toughness of the films described are, however, insufficient.

EP-A-42 831 describes a lid system which comprises a sealable (=substrate) layer consisting of poly(ethylene/vinyl acetate) and homopolystyrene and a polyester top layer. These layers are bonded by means of an adhesive which is not described in detail. Polystyrene cups are sealed therewith in a peelable manner.

To permit easier recycling, plastic lids are to replace aluminum lids. However, the known systems are not suitable for this purpose since they are for the major part (>80%) composed of materials which are incompatible with polystyrene. Moreover, the adhesives used are frequently crosslinked or, where they are thermoplastic, consist of polyurethane or polyacrylate, which together with the polyester substrate layer used further restricts the possibility of recycling. This means that recycling together with polystyrene (the usual cup material) is not possible. Another possibility would be to add recycled material to the sealable layer. Experience has that it is precisely the peelability which is very sensitive to the composition of the components. The addition of a recycled material contaminated with polyester and adhesive would no longer ensure closure of polystyrene containers to meet quality assurance standards.

DE-A 39 21 677 describes a complete lid system comprising a heat-seal layer, a substrate layer and a top layer, which may furthermore be bonded by means of adhesion promoters. The polymers on which the sealing and top layer are based are high impact polystyrene and styrene/butadiene block copolymers. Experience has shown that the combination of toughness, adhesion and peelability is not yet sufficient to permit aluminum lids to be replaced. In addition, the coextruded top layer frequently requires an adhesion promoter, owing to a strong tendency toward delamination. This requires the use of expensive coextrusion units.

Furthermore, the nature of the sealing layer used results in small residues remaining on the cup lip, which may cause the end user to have doubts about the cleanness of the packed food.

SUMMARY OF THE INVENTION

The present invention relates to a multilayer, sealable plastics film, essentially comprising A: a top layer A of a polymer which is dimensionally stable at elevated temperatures and has a melting point above 200° C., B: an adhesion promoter B of from 30 to 95% by weight of a styrene/butadine block copolymer, of a styrene/butadiene block copolymer which contains up to 95% by weight of a styrene component and/or high impact polystyrene and from 5 to 70% by weight of a polymer which is incompatible with polystyrene and contains polar groups, the percentages being based on B, the styrene/butadiene block copolymer containing up to 95% by weight of polystyrene or high impact polystyrene, C: a substrate layer C of from 5 to 100% by weight of a styrene/butadiene block copolymer and up to 95% by weight of polystyrene and/or high impact polystyrene, D: if required, a barrier layer D which may correspond to the top layer A may be incorporated between layer C and layer E and E: a sealing layer E whose composition essentially corresponds to that of the adhesion promoter B.

The novel lid laminate combines a number of advantages which are not achieved by all the known proposals together:

Simple production on existing coextrusion units
Good recycling properties of the punch waste and the finished cup
Good sealing and peelability
No delamination during peeling, no residues on the cup lip
High toughness (no tearing during the peeling process, in particular in the case of hooded lids; no indentation during transport)
No migration of ingredients (for example solvents) or undesirable permeation (for example $O_2$, $H_2O$ )
Existing sealing units can be easily converted from aluminum to plastic
Little sensitivity of the peelability and sealing to the sealing conditions, in particular temperature fluctuations
No adhesion to the sealing jaws
Can easily be printed
No change in the cup material
No blocking of the films and of the lid
Sterilizable (for example with $H_2O_2$)

The novel lid laminate as described below meets these requirements. From the production point of view, it has the following additional advantages:

According to the invention, the layers B and E consist of the same material. It is therefore possible to use coextrusion units which are designed for a three-layer system.

The styrene/butadiene block copolymer used is present in the layers B, C and E and ensures very strong bonding between the layers, so that no delamination takes place under tear-off conditions.

The substrate layer may contain recycled material, for example adhesion promoter punch wastes or edge trimmings of the lid film without the sealing or adhesion promoter properties being influenced. This is supported by the very similar composition (styrene/butadiene copolymer) of the layers B, C and E.

The use of adhesion promoter and sealing layer of identical composition provides sufficient material to enable the essentially incompatible top layer, which may be, for example, a polyester, to be made compatible and hence suitable for recycling without separation. This is a considerable advantage over systems which use adhesives and coatings or over aluminum.

The top layer A consists of a polymer having a melting point above 200° C. For example, PBT, PET, PA, etc. are suitable for this purpose. These materials have the advantage over the usual coatings on plastic lids that they themselves have great toughness and are therefore also able to withstand rigorous sealing conditions (great forces, small sealing areas). This permits, for example, use in special sealing machines which are intended to achieve secure closing. Moreover, the flowing away of the lower layers which are less dimensionally stable at elevated temperatures is reduced by the polymeric top layer.

The (polar) top layer A also serves as a barrier against water vapor and oxygen.

Embedding the substrate layer C, which may contain recycled material, between two other layers prevents the transfer (migration) of any substances which are introduced by the recycled material and are in principle nontoxic but may adversely affect the organoleptic properties. This effect can be improved by additionally providing a barrier layer D. In the simplest cases, the barrier layer D consists of the material of the top layer A. It may also consist of another material, but this is technically more complicated to realize in practice.

The novel film can be processed on existing sealing units without changing the tools or cups.

The known plastics films require a protective coating, which is intended to prevent adhesion to the sealing tool. In contrast, the novel film requires no protective coating. The top layer is also directly printable.

DESCRIPTION OF THE PREFERRED EMBODIMENTS

Layer A

The layer A should have a high melting point and prevent adhesion of the heat-seal films to the sealing head. Suitable materials for layer A are all thermoplastics whose melting point or softening range is above 200° C., preferably about 230° C. For example, the plastics shown in the Table are thus suitable.

TABLE

| | Materials suitable for layer A | |
|---|---|---|
| Usual name | Chemical composition | Melting point |
| Nylon 6 | Polycaprolactam | 220 |
| Nylon 6.6 | Polyhexamethyleneadipamide | 255 |
| Polyamide copolymerized with butylene terephthalate | Based on hexamethylenediamine, terephthalic acid and caprolactam | 298 |
| Polybutylene terephthalate | Condensate of terephthalic acid or dimethylphthalic acid and 1,4-butanediol | 220–225 |

Other examples are polyphenylene oxide and blends thereof with polystyrene; polysulfones; polyether sulfones; polyetherketones; LC polymers; polyetherimides; crystalline polyethylene terephthalate; polyphenylene sulfide; polyamide/imide copolymers or polyamides having the structure of nylon 6.12, 11, 4.6, etc., according to the melting point.

Layer B

Layer B both acts as an adhesion promoter between the substrate layer and the top layer and, as in the case with layer E identical to B, is heat-sealable. A precondition for this dual function is that it is a mixture of two or more polymers. One polymer corresponds to a component of layer C. This ensures adhesion promotion with respect to the substrate layer C.

The other polymer must be incompatible with styrene polymers and must contain polar groups. The first property prevents welding to the cup material, which typically consists of polystyrene. The second property ensures sufficiently strong interactions with the polar layer A, which is dimensionally stable at elevated temperatures, in order to achieve adhesion promotion which is greater than the seal to the cup material.

Two polymers whose mixture gives two glass transition temperatures which do not change with the composition of the system are regarded as being incompatible (H. G. Elias, Makromoleküle, Volume 1, 5th Edition, Hüthig und Wepf Verlag (1990), page 680).

Suitable polar polymers which are incompatible with the layer C are:
Copolymers which contain from 70 to 90% by weight of styrene and from 10 to 30% by weight of acrylonitrile;
Copolymers which contain from 50 to 90% by weight of styrene and from 10 to 50% by weight of an alkyl acrylate or methacrylate;
Methyl (meth)acrylate;
Polyethylenes and/or copolymers of ethylene containing ethylene in excess with polar comonomers. Examples of polar comonomers are vinyl alcohol, vinyl acetate, methyl acrylate, ethyl acrylate, butyl acrylate and acrylic acid. This list, which is not exhaustive, includes the ionomers, as described, for example, in H. Domininghaus, Die Kunststoffe und ihre Eigenschaften, 3rd Edition, VDI-Verlag (1988), pages 125 et seq.;
Polar polyethylenes modified, for example, by chlorination, sulfochlorination, phosphorylation, sulfophosphorylation, sulfation and oxidation;
Copolymers of ethylene and polyethylenes grafted so that they contain polar groups;
Polyvinyl chloride and polyvinylidene chloride and blends of these with polyethylenes and polyethylene copolymers, as well as blends with acrylate polymers or vinylidene chloride/acrylonitrile copolymers.

Further polar polymers which are incompatible with styrene polymers are, for example, polyvinyl alkyl ether, polyvinyl alcohol, polyvinyl acetal, polyvinyl acetate and copolymers thereof and polyethylene oxide.

Layer C

Layer C of the novel sealable plastics film may be regarded as the substrate (substrate film) of the heat-sealable plastics film. Suitable substrates are in principle all thermoplastic substances based on styrene and butadiene, ie. high impact polystyrene, styrene/butadiene block copolymers, blends of styrene homopolymers or styrene/butadiene graft copolymers with styrene/butadiene block copolymers. Blends which contain one of the above components based on polystyrene and further components compatible with the polystyrene (for example polyphenylene ethers) or components which are compatible via compatibility promoters (for example polyethylene according to EP-A-310 051) are also suitable.

A preferred layer C comprises a block copolymer of one or more blocks of styrene and one or more blocks of conjugated diene selected from the group consisting of butadiene and isoprene or mixtures thereof.

The block copolymers may consist of only two blocks and may be linear or branched. Block copolymers and processes for their preparation are described in German Published Applications DAS 108, 491, DAS 1,465,406 and DAS 1,420,698 and U.S. Patent 3,030,364. Branched products are disclosed in German Published Applications DAS 1,934,348, DAS 1,959,922 and DAS 2,550,227. Processes for the preparation of branched block copolymers are also described there or in German Laid-Open Application DOS 3,248,746. The block copolymer may be selectively or nonselectively hydrogenated.

Styrene/butadiene block copolymers having a well-defined or tapered transition are preferred. Any block copolymer, without restriction as to its composition, may be used as the styrene/butadiene block copolymer, provided that it is prepared by the anionic solution polymerization method using an alkyllithium compound as the catalyst. Both elastomeric styrene/butadiene block copolymers and resin-like styrene/butadiene block copolymers having a butadiene content of less than 50% by weight may be formed. If elastomeric styrene/elastomeric block copolymers having a butadiene content of more than 50% by weight are used, the content thereof in the mixture is preferably from 20 to 40% by weight but may also be higher or lower.

Resin-like styrene/butadiene block copolymers having a styrene content of more than 50, in particular from 60 to 95, % by weight are preferably used.

Blends of block copolymers with other styrene polymers are also suitable. Examples of these are blends containing polystyrene or high impact polystyrene. In general, homopolymers or copolymers of styrene with one of the closely related, in particular methyl-substituted, styrenes in which a methyl radical is present as a substituent on the aromatic ring or on the side chain are suitable. p-Methylstyrene and α-methylstyrene may be mentioned in particular here. These copolymers can be prepared from styrene or a substituted styrene in a conventional manner. Other suitable styrene polymers are graft copolymers which are prepared by polymerization of styrene or a substituted styrene in the presence of a rubber, for example a butadiene polymer or rubber-like styrene/butadiene polymers. The polybutadiene content may be from 3 to 20, preferably from 5 to 12, % by weight, based on the polystyrene component in the blend. The styrene-grafted rubber (soft phase) is present in a finely dispersed form in a polystyrene phase which is regarded as the hard matrix. The preparation of high impact polystyrene is known. Polystyrene and polymers of substituted styrenes as well as the high impact polystyrenes are commercially available. The viscosity number should be from 60 to 120 ml/g, measured in 0.5% strength solution in toluene at 23° C.

Layer D

Layer D corresponds in composition to layer A; reference may be made to the data above.

Layer E

Layer E corresponds in composition to layer B.

Each layer may contain the additives typical for the particular polymers, for example fillers, dyes, pigments, antistatic agents, antioxidants, lubricants and plasticizers which are customary in the corresponding materials.

The novel heat-sealable plastics film is preferably produced by the coextrusion method. This method is known. Coextrusion may be carried out at melt temperatures of from about 170° to 350° C. The individual components are melted in different extruders and either are combined in multiple slot dies or annular dies or the layers are combined in an adapter. It is also possible to combine one or more layers with one another by lamination.

During the extrusion, the thickness of the individual layers can be adapted to the requirements for the finished films, for example by varying the extruder speeds.

The following may be stated specifically in this respect:

In the case of lid films there are in principle two layer thickness ranges. On the one hand, flat films whose total thickness is from 80 to 120 μm are used. On the other hand, thicker films are used, these having a layer thickness of 180–250 μm and being employed as hooded lids after thermoforming.

In these films, the substrate layer C is the thickest of all the layers for reasons of cost. It has, for example, a thickness of from 50 to 100 μm or from 50 to 200 μM. The other layers are kept as thin as possible, according to the film manufacturer's skill (eg. from 5 to 30 μm). The lower limit of the minimum layer thickness is determined by the variation in the layer thickness. This applies especially to layers B, D and E, which are generally 10–20 μm thick. To improve the toughness, it is possible to abandon the cost minimization principle in the case of layer A, ie. up to 30 μm may therefore be useful instead of 10–20 μm. Use of the heat-sealable plastics film The heat-seal films thus formed are sealed, on the conventional sealing apparatuses used for heat sealing, onto containers consisting of styrene polymers, for example homopolystyrene, a styrene/butadiene graft polymer or block copolymer or a blend of these substances. The containers may also consist of other styrene polymers, for example having a certain content of copolymers such as acrylonitrile. multilayer films are very frequently used for packaging. These too are suitable for sealing with the heat-sealable plastics films, provided that the inner layer onto which the lid is sealed consists of a styrene polymer which seals against the component D or F of the heat-sealable film.

For a given form of the sealing head, the sealing conditions are governed by the temperature of the sealing head, the pressure during the sealing process and the sealing time. Because the thermal conductivity of the heat-sealable plastics film is low compared with aluminum foils, the sealing conditions are dependent to a very great extent on the thickness of the sealable plastics film. For example, a 0.1 mm thick film can be satisfactorily sealed in as little as from 0.2 to 0.3 sec at a sealing temperature of 200° C. and a sealing pressure of 2 bar, whereas a 0.25 mm thick film requires a sealing time of from 0.8 to 1 sec under the same conditions.

Depending on the type of component A of the heat-sealable plastics film, suitable sealing conditions are pressures of from 1 to 5 bar, sealing temperatures of from 140° to 280° C. and sealing times of from 0.1 to 2 sec.

EXAMPLE 1

The sealable plastics film is produced by the coextrusion method from the following materials:

Layer A

Polybutylene terephthalate, melting point 220°-225° C., determined according to ISO 1218.

Layer B:

80% of a star styrene/butadiene block copolymer, prepared by anionic polymerization, viscosity number 84 ml/g, determined in a 0.5% strength solution in toluene, polybutadiene content 20%.

20% of an ethylene/vinyl acetate copolymer having a vinyl acetate content of 28%.

Layer C:

A star styrene/butadiene block copolymer, prepared by anionic polymerization, viscosity number 84 ml/g, determined in 0.5% strength solution in toluene, polybutadiene content 20%.

Layer E:

Identical to B.

C is fed through a main extruder, A through a side extruder and B and E through a side extruder having a branch, to a multiple slot die in such a way that the following layer thicknesses are obtained:
Layer A: 20 μm
Layer B: 10 μm
Layer C: 110 μm
Layer E: 10 μm The processing temperatures of the molding materials were
Component A: 250°
Component B: 190°
Component C: 200°
Component E: 190°

COMPARATIVE EXPERIMENT 1

A 40 μm thick aluminum foil having an acrylate-based seal coat.

COMPARATIVE EXPERIMENT 2

A film as claimed in claim 6 of DE 39 21 677 (four layers, four extruders).

EXAMPLE 2

As for Example 1; the layer system is supplemented by layer D through a further branch of a side extruder outlet.

The material thicknesses achieved were
Layer A: 10 μm
Layer B: 10 μm
Layer C: 110 μm
Layer D: 10 μm
Layer E: 10 μm The parameters used for evaluating the sealing behavior were determined as follows:

1. Sealing conditions for different settings of the sealing head according to temperature (° C.), pressure (bar) and time (sec). The films were sealed onto commercial thermoformed packaging cups of high impact polystyrene, having a butadiene content of 6%, a Vicat index of 90° C. (DIN 53,460, Method A), and a melt flow index of 4 g/10 min (MFI: 200° C./5 according to DIN 53,735).

2. Determination of the peeling strength from the cup

Packaging cups were sealed under different conditions, and the peeling strength of the sealing film from the cup was determined using specially produced apparatus. For this purpose, the cups were placed on the table of a universal pressure and tension machine and were fixed. A projecting corner of the sealed-on lid was gripped and was connected to the upper clamping jaw of the tester via an extension.

The tensile force was built up at a rate of 10 mm/min and the lid was peeled off. The tensile force applied until the first tear occurred and the force required for further tearing to the seal seam in the middle of the lid were determined (tensile force measured in Newton).

|  | Sealing conditions | | | Peeling Strength | |
| --- | --- | --- | --- | --- | --- |
| Example | Temperature [°C.] | Pressure [bar] | Time [sec] | Force to first tear [N] | Force for further tearing to middle of lid [N] |
| 1 | 220 | 2 | 0.5 | 19.5 | 3.0 |
| 1 | 240 | 2 | 0.5 | 23.7 | 3.3 |
| 1 | 260 | 2 | 0.5 | 28.2 | 3.5 |
| Comp. Exp. 1 | 220 | 2 | 0.2 | 27.2 | 3.2 |
| Comp. Exp. 1 | 240 | 2 | 0.2 | 26.3 | 3.2 |
| Comp. Exp. 1 | 260 | 2 | 0.2 | 29.5 | 3.5 |
| Comp. Exp. 2 | 220 | 2 | 1 | 21.3 | 2.2 |
| Comp. Exp. 2 | 240 | 2 | 1 | 20.0 | 2.3 |
| Comp. Exp. 2 | 260 | 2 | 0.8 | 3.2 | >0.5 |
| 2 | 220 | 2 | 0.5 | 19.2 | 2.5 |
| 2 | 240 | 2 | 0.5 | 22.2 | 3.7 |
| 2 | 260 | 2 | 0.5 | 27.5 | 3.3 |

We claim:

1. A multilayer, sealable plastic film, comprising
A: a top layer A consisting essentially of a polymer which is dimensionally stable at elevated temperatures and has a melting point above 200° C.,
B: an adhesion promoter layer B directly bonded to the top layer A, wherein said adhesion promoter layer B consists essentially of a blend of 1) from 30 to 95% by weight based on layer B of a styrene/butadiene block copolymer which contains up to 95% by weight of styrene component and 2) from 5 to 70% by weight based on layer B of a polymer which is incompatible with polystyrene and contains polar groups,
C: a substrate layer C directly bonded to the layer B, which substrate layer consists essentially of from 5 to 100% by weight of a styrene/butadiene block copolymer and up to 95% by weight of polystyrene or high-impact polystyrene, and
E: a sealing layer E, bonded to a surface of substrate layer C opposite that bonded to the layer B and the composition of which is essentially the same as that of an adhesion promoter layer B.

2. A film as defined in claim 1, wherein the adhesion promoter B consists essentially of a blend of 1) from 50 to 90% by weight of a styrene/butadiene block copolymer which contains up to 80% by weight of styrene component and 2) from 10 to 50% by weight of a polymer which is incompatible with polystyrene and contains polar groups and wherein the substrate layer C consists essentially of from 20 to 95% by weight of a styrene/butadiene block copolymer and from 5 to 80% by weight of polystyrene or high-impact polystyrene.

3. A film as defined in claim 1, wherein the top layer A consists essentially of a polyamide or a polyester.

4. A film as defined in claim 1, which additionally contains between layers C and E, a layer D, which is a barrier layer the composition of which is essentially the same as that of the top layer A.

5. A film as claimed in claim 4, wherein layer D is a polyamide or polyester.

* * * * *